United States Patent [19]
Alexander et al.

[11] Patent Number: 5,985,981
[45] Date of Patent: Nov. 16, 1999

[54] ELASTOMERIC PRIMER FOR USE WITH EPDM ROOFING MEMBRANES

[75] Inventors: Brian S. Alexander, Sheridan; John W. Fieldhouse, Carmel; William B. Gorman, Mooresville; Carter C. Slusher, Carmel, all of Ind.

[73] Assignee: Bridgestone/Firestone, Inc., Akron, Ohio

[21] Appl. No.: 08/992,386

[22] Filed: Dec. 17, 1997

[51] Int. Cl.[6] ............................. C08J 3/00; C08K 3/20; C08L 75/00; C08F 8/30
[52] U.S. Cl. .......................... 524/507; 524/589; 524/590; 525/123; 525/129; 525/455
[58] Field of Search ..................... 525/123, 455, 525/129; 514/507, 589, 590

[56] References Cited

U.S. PATENT DOCUMENTS

| | | | |
|---|---|---|---|
| 3,337,481 | 8/1967 | Singelyn et al. | 260/3.5 |
| 4,256,615 | 3/1981 | Legue | 260/18 |
| 4,603,164 | 7/1986 | Chmiel et al. | 524/432 |
| 4,640,730 | 2/1987 | Streets et al. | 156/334 |
| 5,008,311 | 4/1991 | Janoski | 524/59 |
| 5,234,987 | 8/1993 | Hubbard et al. | 524/505 |
| 5,242,727 | 9/1993 | Briddell et al. | 428/42 |
| 5,849,133 | 12/1998 | Senderling et al. | 156/315 |

FOREIGN PATENT DOCUMENTS

| | | | |
|---|---|---|---|
| 0 451 978 A2 | 4/1991 | European Pat. Off. | C08G 18/10 |
| 0 422 810 A2 | 10/1991 | European Pat. Off. | C09D 161/06 |
| 814 699 | 6/1959 | United Kingdom . | |

*Primary Examiner*—Patrick D. Niland
*Attorney, Agent, or Firm*—Daniel N. Hall

[57] ABSTRACT

A roofing primer composition including a bromobutyl rubber, a polyurethane, wherein the polyurethane is the reaction product of a phenolic resin and an isocyanate having more than two functionalities, the polyurethane being formed in the presence of a catalyst, and a solvent, wherein the solvent is preferably selected from the group consisting of parachlorobenzotrifluoride, 1-dodecene, toluene, hexane, heptane methylene chloride, 1,1,1-trichlorethane, xylene, methanol, 1-tetradecene, chloroform, tetrachloro ethylene and ethanol. This primer composition exhibits improved adhesion during application, exhibits improved shelf life, is not water sensitive, and can contain a low volatile solvent.

39 Claims, No Drawings

ELASTOMERIC PRIMER FOR USE WITH EPDM ROOFING MEMBRANES

TECHNICAL FIELD

The present invention is directed toward a composition of matter useful as a primer that can be applied to a roofing membrane prior to the application of an adhesive. More specifically the present invention is directed toward an elastomeric primer composition that contains polyurethane, and preferably a low volatile solvent.

BACKGROUND OF THE INVENTION

In the art of covering roofs with elastomeric membranes, such as EPDM terpolymer membranes, it is common to apply a primer to the membrane or roofing structure before application of an adhesive. Adhesives typically include adhesive tapes or solvent based adhesives. Primers can include those that are pure solvent, i.e., those that do not contain any solids, and those that are blends of asphalt and solvent, or polymer and solvent. Those skilled in the art will recognize that solvent based adhesives and primers are similar in composition and serve similar purposes, except that primers typically contain a lower solids content.

For example, U.S. Pat. No. 4,640,730 teaches a process for adhering roofing membranes using an adhesive composition containing a thermoplastic block copolymer, an aromatic hydrocarbon resin, and a solvent. Once the composition sets, heat must be applied to join the surfaces. It has been found, however, that equal and even application is difficult to achieve during field installations, thereby resulting in an improper and imperfect field seam or lap splice.

U.S. Pat. No. 5,008,311 teaches an elastomeric asphalt compound comprising an asphalt (bitumen) component, an isocyanate prepolymer component, and a volatile compatibilizer component. The isocyanate prepolymer component polymerizes within the asphalt subsequent to application, thereby providing a polymer network within the asphalt that provides strength and cohesion. The use of this adhesive as a seam adhesive is problematic, however, because it fails to develop sufficient or adequate strength and resistance to creep rupture. It is believed that the presence of asphalt causes swelling in the EPDM membrane. This adhesive is also undesirable because it requires moisture to initiate the curing process. Finally, the shelf life of this adhesive is unacceptable, especially after the composition has been exposed to the air.

U.S. Pat. No. 5,234,987 teaches a solvent-base adhesive composition for adhering together EPDM roofing membranes that includes a halogenated copolymer of isobutylene and p-methyl styrene, a thermoplastic rubber comprising a styrene-ethylene-butylene-styrene block copolymer, an endblock resin for the thermoplastic rubber, a tackifier, an accelerator/cure package, and a solvent. This composition exhibits a peel strength of at least 3.0 pounds per lineal inch at room temperature, and at least 3.0 pounds per lineal inch at 212° F. This composition has been found less than desirable for primer solutions, however, because the adhesive lacks surface tack that is essential to seam construction. Also, this adhesive lacks sufficient early green strength, which is especially problematic in high stress details common in roofing application, e.g., corner patch flashings. These details have been known to bridge or come loose after only a few hours.

U.S. Pat. No. 4,603,164 is directed toward a solvent based contact adhesive that includes a halogenated butyl rubber, a pre-crosslinked butyl rubber, a ethylene-propylene-nonconjugated diene terpolymer, a thermoplastic petroleum based hydrocarbon feed stock derived from aliphatic monomer resin, and an aliphatic isocyanate. This composition can serve to join cured EPDM membranes and maintain satisfactory creep, cold flow and heat strength characteristics. The organic isocyanate ingredient of this invention functions to provide a cure of the halogenated butyl rubber when exposed to moisture.

Because of the early creep rupture at room temperature, early green strength, and limited shelf life associated with primer adhesive compositions known in the art, there is a need for an improved primer composition.

SUMMARY OF INVENTION

It is therefore, an object of the present invention to provide an elastomeric based primer composition.

It is another object of the present invention to provide an elastomeric based primer composition exhibiting improved adhesion during application.

It is yet another object of the present invention to provide an elastomeric primer exhibiting improved shelf life.

It is still another object to provide an elastomeric primer that is not moisture sensitive.

It is another object of the present invention to provide an elastomeric based primer composition that has a low volatile organic compound content in accord with current environmental regulations.

It is yet another object of the present invention to provide an elastomeric primer that is useful over a range of temperature conditions.

At least one or more of the foregoing objects, together with the advantages thereof over the known art relating to elastomeric primer compositions, which shall become apparent from the specification that follows, are accomplished by the invention as hereinafter described and claimed.

In general the present invention provides a roofing primer composition comprising a bromobutyl rubber, from about 18 to about 38 parts by weight per one hundred parts by weight rubber of a polyurethane, wherein said polyurethane is the reaction product of a phenolic resin and an isocyanate having more than two functionalities, said polyurethane being formed in the presence of an alkali phenoxide catalyst and a solvent, wherein said solvent is selected from the group consisting of parachlorobenzotrifluoride, 1-dodecene, toluene, hexane, heptane methylene chloride, 1,1,1-trichlorethane, xylene, methanol, 1-tetradecene, chloroform, tetrachloro ethylene and ethanol.

The present invention also provides a roofing primer composition comprising an elastomer, a polyurethane component, and a solvent.

The present invention further provides a primer composition prepared by the step of admixing a composition comprising a polyisocyanate component, a polyol component, a catalyst for enhancing the formation of polyurethane, an elastomer and a solvent.

The present invention also includes a method for preparing a roofing primer composition comprising the step of admixing a polyisocyanate component, a phenolic resin component, a catalyst for enhancing the formation of polyurethane, an elastomer; and a solvent.

The present invention further includes a method of priming an EPDM membrane prior to the application of an adhesive comprising the step of applying a primer composition to an EPDM membrane, the primer composition including a bromobutyl rubber, from about 18 to about 38 parts by weight per one hundred parts by weight rubber of a polyurethane, wherein the polyurethane is the reaction product of a phenolic resin and an isocyanate having more than two functionalities, the polyurethane being formed in the presence of an alkali phenoxide catalyst, and a solvent, wherein the solvent is selected from the group consisting of parachlorobenzotrifluoride, 1-dodecene, toluene, hexane, heptane, methylene chloride, 1,1,1-trichlorethane, xylene, methanol, 1-tetradecene, chloroform, tetrachloro ethylene and ethanol.

The present invention further provides a method of priming areas of a rooftop prior to the application of an asphalt roofing material comprising the step of applying a primer to an area of a roof, wherein the primer includes a bromobutyl rubber, from about 18 to about 38 parts by weight per one hundred parts by weight rubber of a polyurethane, wherein the polyurethane is the reaction product of a phenolic resin and an isocyanate having more than two functionalities, the polyurethane being formed in the presence of an alkali phenoxide catalyst, and a solvent, wherein the solvent is selected from the group consisting of parachlorobenzotrifluoride, 1-dodecene, toluene, hexane, heptane, methylene chloride, 1,1,1-trichlorethane, xylene, methanol, 1-tetradecene, chloroform, tetrachloro ethylene and ethanol.

The present invention yet further provides a roof system comprising an EPDM membrane, wherein the membrane has been primed prior to the application of an adhesive, the primer including a bromobutyl rubber, from about 18 to about 38 parts by weight per one hundred parts by weight rubber of a polyurethane, wherein the polyurethane is the reaction product of a phenolic resin and an isocyanate having more than two functionalities, the polyurethane being formed in the presence of an alkali phenoxide catalyst, and a solvent, wherein the solvent is selected from the group consisting of parachlorobenzotrifluoride, 1-dodecene, toluene, hexane, heptane, methylene chloride, 1,1,1-trichlorethane, xylene, methanol, 1-tetradecene, chloroform, tetrachloro ethylene and ethanol.

PREFERRED EMBODIMENT FOR CARRYING OUT THE INVENTION

It has now been found that a highly useful and improved primer can be formed from a composition including a blend of a polyurethane and an elastomer. These highly useful primers exhibit improved peel adhesion, green strength, resistance to creep rupture at about 70° C., shelf stability, lack of water sensitivity, and improved surface tack. These performance characteristics are particularly important during the first 24 hours after a field seam or lap splice seam is created.

Accordingly, the present invention is directed toward a primer composition that includes an elastomer, a polyurethane component, and a solvent. In a preferred embodiment of the present invention, the primer composition includes an elastomer, from about 18 to about 38 parts by weight per hundred parts by weight rubber (phr) of a polyurethane component, and from about 700 to about 1,600 parts by weight phr of a solvent. Even more preferably, the composition contains an elastomer, from about 23 to about 33 parts by weight phr of a polyurethane component, and from about 800 to about 1,300 parts by weight phr of a solvent.

Where the composition of the present invention is employed as a solvent based adhesive, as opposed to a primer solution, the composition will include an elastomer, from about 23 to about 33 parts by weight phr of a polyurethane component, and from about 400 to about 1,000 parts by weight phr of a solvent.

The elastomers that can be used in the present invention include halogenated polyisobutylene (bromobutyl rubber), polyisobutylene (butyl rubber), polybutadiene, polyisoprene, halogenated polyisobutylene paramethyl styrene, chlorinated polyisoprene, and polyvinyl chloride. Preferred are halogenated elastomers, and more preferred are halogenated butyl containing elastomers. These halogenated butyl elastomers include, but are not limited to, chloro butyl, bromobutyl, crosslinked bromobutyls and halogenated polyisobutylene paramethyl styrene.

Elastomers that are useful in the present invention can be purchased from Bayer Fibers, Organics and Rubber Division of Akron, Ohio, under the tradename POLYSAR® BROMOBUTYL. Elastomers can also be purchased from Exxon Chemicals of Houston, Tex., under the tradename EXXON BROMOBUTYL and EXPRO®, as well as from Hardman, Inc. of Belleville, N.J., under the tradename KALAR®.

As discussed above, the primer composition of the present invention also includes a polyurethane component. It is preferred that this polyurethane component include a highly branched polyurethane. Those skilled in the art will recognize that highly branched polyurethanes are derived from multi-functional polyisocyanates and multi-functional polyols.

As those skilled in the art will also appreciate, polyurethanes are best described with respect to the reactants that form the polyurethane. Accordingly, polyurethanes useful in the present invention can be formed from an isocyanate and a polyol. Those skilled in the art will understand that the isocyanate and polyol are reacted in a molar ratio so as to achieve a one to one reaction between an isocyanate group and a hydroxyl group within the polyol. It is preferred however, to use an excess of the hydroxyl group reactant; this excess can include a hydroxyl group to isocyanate ratio of about 2.5:1. Accordingly, if a tri-functional isocyanate is employed, sufficient polyol will be reacted to provide at least three hydroxyl groups per mole of isocyanate; and preferably a hydroxyl group to isocyanate ratio of 4.5:1. Generally, on a weight basis, from about 6.6 to about 10 parts by weight of the preferred tri-functional isocyanate component is reacted with about 16 to about 24 parts by weight of the preferred thermoplastic polyol component phr. Preferably, from about 7.5 to about 9.1 parts by weight of the preferred tri-functional isocyanate component is reacted with about 16 to about 22 parts by weight of the preferred thermoplastic polyol component phr.

Preferred polyols are multi-functional polyols, with resinous or thermoplastic polyols being more preferred. The resins most useful are those phenolic resins that are derived from the polymerization of alkyl phenols and formaldehyde. Typically, the ratio of alkyl phenol to formaldehyde is about 1.5:1. The other type of resin that is less preferred is a resol resin. Resol resins, which are typically the reaction product of alkyl phenols and formaldehyde where the ratio of alkyl phenol to formaldehyde is less than about 1:1 can also be used.

Useful polyols include those available from Schenectady, Inc., of Schenectady, N.Y., under the tradename SP 560, SP-1068, or SP 1090. Also, those resols sold by PMC Specialties Group, Inc., of Cleveland, Ohio under the tradename DYPHENE 8318, 8330 or 8340.

Isocyanates useful for forming the polyurethane component of the present invention are multi-functional isocyanates. By multi-functional, it is meant that the isocyanates have more than two functionalities per molecule, on average. Accordingly, useful isocyanates include polymeric MDI (methylene diphenyl diisocyanate) polymeric IPDI (isophorone diisocyanate), and polymeric 1,6-hexane diisocyanate. These isocyanates can be purchased under the tradenames RUBINATE® 9257 (MDI), POLYISOCYANATE T 1890 (IPDI), and DESMODUR N-75 (trimer of 1,6-hexane diisocyanate), respectively. RUBINATE is a registered trademark of the ICI Polyurethane, Inc. of West Deptford, N.J., and DESMODUR is a tradename of Bayer Fiber, Organics and Rubber Division of Akron, Ohio. The most preferred isocyanate is a tri-functional isocyanate, such as RUBINATE 9257.

In an especially preferred embodiment, the polyurethane is prepared or formed in the presence of a metallic complex catalyst. Useful metallic complex catalysts include Group I metal salts, i.e., alkali salts, of carboxylic acids such as stearates, octoates and phenoxides, as well as Lewis Acids such as tin salts, zinc chloride, ferric chloride and tin octoate. Especially preferred are alkali salts of phenoxides. The most preferred alkali salt of a phenoxide is potassium p-nonylphenoxide. As those skilled in the art will recognize, the preferred potassium p-nonylphenoxide can be formed from the reaction of p-nonylphenol and potassium hydroxide, preferably within toluene. Generally, the catalyst should be employed in a catalytically effective amount such as an amount from about 2 to about 5 parts by weight per hundred parts by weight rubber, and even more preferably from about 3 to about 4 parts by weight per hundred parts by weight rubber.

As discussed above, the primer composition of the present invention will also include a solvent. Any solvent that will serve to adequately disperse the elastomer and the polyurethane in solution is useful for purposes of the present invention. Preferred solvents include toluene, hexane, xylene, heptane, methanol and ethanol. It should be understood that a blend of solvents may be employed.

In an especially preferred embodiment of the present invention, the preferred solvents are those currently recognized by most environmental agencies as exempt. Volatile Organic Compounds (VOC's). These solvents generally include parachlorobenzotrifluoride (PCBTF), 1-dodecene, methylene chloride, 1-tetradecene, chloroform, tetrachloro ethylene, and 1,1,1-trichlorethane.

Parachlorobenzotrifluoride can be purchased under the tradename OXSOL 100 from Occidental Chemical Company of Dallas, Tex. 1-dodecene or t-tetradecene, can be purchased from Amoco company of Chicago, Ill., under the tradenames ALPHA OLEFIN C-12or ALPHA OLEFIN C-14, respectively. Tetrachloro ethylene can be purchased from ICI Chemical of Wilmington, Del. under the tradename PERKLONE D.

It has unexpectedly been found that the preferred bromobutyl elastomer rubber, and preferred polyurethane, which is the reaction product of a tri-functional isocyanate and phenolic resin, are soluble in parachlorobenzotrifluoride or 1-dodecene. Accordingly, parachlorobenzotrifluoride, toluene, and 1-dodecene are especially preferred.

Other possible additives include those modifiers and additives conventionally used in the formation of natural and synthetic elastomers. These additives include flame retardants, reinforcements, including both particulate and fibrous reinforcements, heavy and light filler, UV stabilizers, blowing agents, perfumants, anti-stats, insecticides, bacteriostats, fungicides, surfactants, plasticisers, and other non-reactive diluents and the like.

Given the above-identified ingredients, those skilled in the art will appreciate a number of methods that can be used to prepare the primer composition of the present invention. It is, however, preferred to prepare the composition by first forming a masterbatch that includes the elastomer and the polyol. This masterbatch is preferably an intimate dispersion of the elastomer and the polyol. For example, in a preferred embodiment of the present invention, the bromobutyl rubber and phenolic resin are masterbatched. One technique that is especially preferred for forming this master batch is to blend the two ingredients using a an internal mixer such as Banbury® mixer. Once intimately mixed or dispersed, the elastomer and polyol can be extruded into pellet form using pelletizing machinery that is common in the art.

Without wishing to be bound by any particular theory, it is believed that the formation of a masterbatch, including the elastomer and the polyol, is responsible for many of the improved properties associated with the composition of the present invention. In fact, when the preferred halogenated butyl rubber and phenolic resin are masterbatched, an interrelationship between the elastomer and the resin, which may include some grafting of the resin to the elastomer, is believed to occur.

One of the significant advantages of the composition of the present intention is its resistivity toward moisture or water. This is especially significant because this moisture resistivity extends the shelf life of the composition. In fact, the shelf life of the composition has been found to be greater than six months, advantageously greater than one year, and even more advantageously greater than two years. As those skilled in the art will appreciate, shelf life is the resistance to an increase in viscosity over a period of time. It is believed that the absence of unreacted isocyanate groups contributes to this increased shelf life, and provides the composition of the present invention an unexpected advantage over the prior art. Indeed, the use of zeolites or desiccants is not necessary to preserve the shelf life of the composition. Numerous other advantages have been observed with the composition of the present invention. Namely, the composition demonstrates improved quickstick, creep rupture resistance or dead weight shear, early peel adhesion or green strength. The absence of any unreacted isocyanates also eliminates the need to monitor personnel exposure to isocyanates.

The fact that the composition of the present invention contains polyurethane, and not reactive isocyanate groups, is a factor that it contributes to the composition's water resistivity. In order to minimize the reactive isocyanate groups that may be present in the compositions of the present invention, it is especially preferred to form the composition in the presence of one of the aforementioned catalysts.

Furthermore, it is highly desirable to add an isocyanate scavenger such as methyl alcohol to the composition in order to scavenge any residual isocyanate groups. Generally, the methyl alcohol is added in an amount from about 5 to about 30 parts by weight per one hundred parts by weight rubber. Preferably, the methyl alcohol is added in an amount from about 10 to about 20 parts by weight per one hundred parts by weight rubber. Other scavengers that may be added include water, primary alcohols and secondary amines.

Because of the many advantages associated with a primer composition that is substantially free of reactive isocyanate groups, it is preferred that the composition of the present invention contain less than about one hundred parts per million of reactive isocyanate groups.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

Several compositions according to the present invention were prepared. Using standardized laboratory testing techniques, the compositions were applied to an EPDM membrane.

The compositions were prepared according to the following general procedure.

Preparation of Potassium p-Nonylphenoxide

About 825 grams of p-nonylphenol was dissolved in about 823 grams of toluene and throughly mixed under a blanket of nitrogen. To this solution, about 233 grams of caustic potash crystals (90% potassium hydroxide) was added, and the solution was continually mixed. The resulting product, potassium p-nonylphenoxide, is soluble in toluene.

Masterbatch of Elastomer and Polyol

Using a Banbury mixer at 100 rpm, about 75 pounds of bromobutyl X-2 polymer was charged, followed by about 22 pounds of SP-1068 phenolic resin and about an additional 33 pounds of bromobutyl X-2. Mixing was continued until the batch reached a temperature of about 250° F. to about 280° F. The resulting compound, which contained an intimate association or dispersion of bromobutyl rubber and phenolic resin, was extruded into pellets, or calendared and cut into small chips. The resultant pellets or chips were flocked with release agents and packaged for use in the mixing of the primer.

Formation of Primer Composition

About 552 pounds of toluene and about 1,944 pounds of Oxsol 100 (parachlorobenzotrifluoride) were mixed. To this solvent mixture, about 316 pounds of the bromobutyl rubber/phenolic resin masterbatch pellets were added and mixed for approximately four hours. To the solution, about 22 pounds of Rubinate 9257 isocyanate was slowly added to the reactor and mixed for about 30 minutes. Then, about 8 pounds of the catalyst potassium nonylphenoxide was slowly added and mixed for an excess of 40 minutes. The composition was then allowed to cool under moderate mixing until the solution reached a temperature of about 122° F. At this point, about 40 pounds of methyl alcohol was added to the reactor and mixed for an additional 30 minutes, then, about 3 pounds of Borden 21R62 carbon black dispersion was added to the reactor and mixed for about ten minutes.

Table I below, lists the ingredients of twelve compositions that were prepared according to the general procedure outlined above. The ingredients are presented in parts by weight based on 100 parts by weight rubber or elastomer.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| Elastomer | | | | | | | | | | | | | |
| Polysar BBX-2 | 100 | 100 | 100 | 100 | 100 | 100 | 100 | 100 | 100 | 100 | 100 | 87.5 | 100 |
| Polyol Resin | | | | | | | | | | | | | |
| SP 1068 | 20 | 20 | 20 | 20 | 20 | 20 | 0 | 20 | 20 | 20 | 20 | 0 | 20 |
| EXCORE Z 5640 | 0 | 0 | 0 | 0 | 0 | 0 | 0 | 0 | 0 | 0 | 0 | 75 | 0 |
| Dyphene 8318 | 0 | 0 | 0 | 0 | 0 | 0 | 20 | 0 | 0 | 0 | 0 | 15.75 | 0 |
| Pentalyn H | 0 | 0 | 0 | 0 | 0 | 0 | 0 | 0 | 0 | 0 | | 0 | 0 |
| Isocyanate | | | | | | | | | | | | | |
| Rubinate 9257 | 8.3 | 8.3 | 8.3 | 8.3 | 8.3 | 8.3 | 8.27 | 8.3 | 8.3 | 8.3 | 8.32 | 6.7 | 8.3 |
| Solvent | | | | | | | | | | | | | |
| Heptane | 0 | 0 | 0 | 0 | 0 | 0 | 0 | 0 | 0 | 0 | 0 | 538 | 0 |
| Toluene | 200 | 200 | 200 | 300 | 300 | 210 | 242 | 200 | 0 | 209.3 | 636 | 538 | 209.3 |
| Dodecene | 0 | 0 | 0 | 0 | 0 | 0 | 0 | 0 | 200 | 0 | 0 | 0 | 0 |
| Oxsol 100 | 500 | 550 | 550 | 900 | 900 | 750 | 485 | 500 | 500 | 737.5 | 0 | 0 | 737.5 |
| Acetone | 0 | 0 | 0 | 0 | 0 | 0 | 0 | 0 | 0 | 0 | 0 | 0 | 0 |
| Scavenger | | | | | | | | | | | | | |
| Methanol | 15 | 15 | 15 | 15 | 15 | 15 | 24 | 15 | 15 | 15 | 0 | 0 | 15 |
| Isopropanol | 0 | 0 | 0 | 0 | 0 | 0 | 0 | 0 | 0 | 0 | 0 | 24 | 0 |
| Catalyst | | | | | | | | | | | | | |
| Potassium p-nonylphenoxide | 3 | 3 | 3 | 3 | 3 | 3 | 3 | 3 | 3 | 3 | 3 | 3 | 3 |
| Other Additives | | | | | | | | | | | | | |
| 21R62 | 0 | 0 | 0 | 0 | 0 | 1 | 0 | 0 | 0 | 1 | 1 | 0 | 1 |
| Fragrance | 0 | 0 | 0 | 0 | 0 | 0 | 0 | 0 | 0 | 4 | 0 | 0 | 0 |
| Sodium Hydroxide | 0 | 0 | 0 | 0 | 0 | 0 | 0 | 0 | 0 | 0 | 0 | 0.25 | 0 |
| Agerite Stalite S | 0 | 0 | 0 | 0 | 0 | 0 | 0 | 0 | 0 | 0 | 0 | 1.75 | 0 |
| UDC Black | 0 | 0 | 0 | 0 | 0 | 0 | 0 | 0 | 0 | 00 | 0 | 1 | 0 |
| Nonylphenol | 0 | 0 | 0 | 0 | 0 | 0 | 0 | 0 | 0 | 0 | 0 | 5.25 | 0 |

With respect to the above-identified elastomers, those skilled in the art will recognize that Polysar BBX-2 is available from Bayer Fibers, Organics and Rubber division of Akron, Ohio. The skilled artisan will likewise recognize that SP 1068 is a phenolic resin available from Schenectady, Inc. of Schenectady, N.Y.; Dyphene 8318 is available from PMC Specialties Group of Cleveland, Ohio; and Pentalyn H is a phenolic resin available from Hercules, Inc. of Wilmington, Del. gEXCOREZ 5340 is available from Exxon. Rubinate 9257 can be purchased from ICI Polyurethanes, Inc. The solvents and scavengers employed are of standard industrial grade, and it should be understood that Oxsol 100 is available from Occidental Chemical Company.

The catalyst employed was potassium p-nonylphenoxide, and was prepared as discussed above.

Finally, with regard to the other additives, it should be understood that 21R62 is available from the Borden Corporation of Cincinnati, Ohio; Agerites Stalite S is available from R. T. Vanderbilt & Co. of Norwalk, Conn.; and that UDC Black is available from Uniroyal Adhesives & Sealants of South Bend, Ind. The sodium hydroxide employed is of standard industrial grade and various fragrances are readily available and can be easily obtained by the skilled artisan.

The compositions were tested for performance properties according to the methods generally described below. Additionally, three comparative samples were likewise tested. The first comparative sample, Sample No. 13, was a primer solution prepared according to U.S. Pat. No. 4,603,164. The other two comparative samples, Sample Nos. 14 and 15, were prepared according to U.S. Pat. No. 5,242,727.

Peel Adhesion Testing

A 6" by 10" piece of cured EPDM sheeting was placed in an air-circulating hood at 72° F. A QuickSeam Scrub Pad and Handle, available from the Firestone Building Products Company, was dipped into a primer composition and used to scrub the primer composition onto the top surface of the EPDM sheeting by using four back-and-forth motions until the entire top surface of the EPDM sheeting was coated with the primer composition. The sample was then allowed to dry for 30 minutes. Thereafter, a 6" piece of QuickSeam Splice Tape, available from the Firestone Building Products Company, was applied about ¼" from the edge of the sheet parallel to the 6" width of the sheet. The release liner is then removed from the tape and the EPDM sheet is folded in half across the 10" length and mated with the exposed top surface of the tape.

This assembly is then rolled with a 15 lb., 3" wide roller in all directions to ensure full contact of the tape and primer. The finished assembly is then cut into six 1" by 5" specimens. The loop formed by the folded EPDM sheeting is then cut to expose the area where no tape is present. These ends were used for clamping the sample into an Instron™ tensile testing machine for peel adhesion testing according to ASTM D413 at a speed of 2" per minute. The result of these tests are reported in Table II hereinbelow.

Sheer Adhesion Sample Preparation

A 6" by 10" piece of cured EPDM sheeting was placed in an air-circulating hood at 72° F. A QuickSeam Scrub Pad and Handle, available from the Firestone Building Products Company, was dipped into a primer composition and used to scrub the primer composition onto the top surface of the EPDM sheeting by using four back-and-forth motions until the entire top surface of the EPDM sheeting was coated with the primer composition. The sample was then allowed to dry for 30 minutes. Thereafter, the sample was cut in half with a razor knife parallel to the 6" width, resulting in two 5" by 6" samples. A 1" by 6" of QuickSeam Splice Tape, available from Firestone Building Products Company, is then applied along the 6" width of the edge of one of the samples. The tape is aligned flush with the edge of the 6" width of the EPDM sample so as not to hang over any edge. The 1" by 6" tape strip is affixed to the primed EPDM sheet along its 6" width. The release liner is then removed from the top of the tape.

A second EPDM sheet sample that is 5" by 6" is applied to the exposed tape by aligning the 6" width of the EPDM sheet with the tape and the edges. The excess of the top EPDM sheet is not aligned with the excess of the bottom sheet. When properly constructed, the sample should be 6" wide by 9" in length with a 1" wide lap splice seam in the middle of the sample.

The finished assembly is then cut into six 1" by 8" specimens with the 1" by 1" lap splice seam in the middle of the specimen. The ends of each specimen will be used for clamping the sample into an Instron tensile testing machine for shear adhesion testing per ASTM D-816 at a test speed of 2" per minute. Table II hereinbelow provides the results of the various tests that were performed on the primer compositions identified in Table I.

Dead Weight Shear Testing

This test measures the creep resistance and green strength of a primer used to adhere an EPDM membrane in a lap shear configuration. According to this test, two 1"×6" strips of EPDM membrane that have been primed with the subject primer solutions are adhered together using a splice tape so as to create a lap configuration having a 1"×1" mated area. A 300 gram weight is hung from each of the samples so that a vertical dead weight shear is imparted to the 1"×1" mated area. The sample is deemed to pass the test if after 24 hours there is less than ⅛ slip or creep. If the slippage is greater than ⅛", the sample fails the test. Table II, hereinbelow, lists the dead weight shear results for the various primer compositions identified in Table I hereinabove.

Specimen Aging

Both the peel and shear testing specimens were aged using a variety of aging and testing conditions. For example, some of the samples were aged at room temperature, which was about 73° F., for about 24 hours, and testing was performed on that specimen at room temperature. The convention employed in the following tables to represent this set of conditions is 24 hours @RT/RT.

Tack Back Testing

The purpose of this test is to measure the cohesive strength and tack of an adhesive (i.e., primer solution) applied to an EPDM membrane. The test is conducted by applying 3.0 ml of adhesive to a surface of a 4"×4"×0.045" piece of EPDM membrane. The adhesive is allowed to set for five minutes and then the membrane is closed by folding the coated area over itself and pressing it closed by hand. The membrane is then carefully rolled with a hand held rubber roller parallel to the fold until the membrane is totally flat and the fold area is void of any air bubbles. The membrane is then allowed to set for 24 hours; at which time the loop opening at the fold is measured in millimeters. The loop opening measurements for the various compositions in Table I are reported in Table II hereinbelow.

Other Physical Properties

Viscosity, was measured by using the procedure set forth in ASTM D1084 method B employing a #4 spindle at 20 rpms; and percent solids were analyzed using standardized laboratory techniques, and have likewise been reported in Table II hereinbelow.

TABLE II

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Dead Weight Shear Testing (pass/fail) | pass | fail | pass | pass | pass | pass | pass | pass | pass | pass | pass | pass | fail | pass | fail | fail |
| Peel Adhesion Testing | | | | | | | | | | | | | | | | |
| 24 hours @ RT/RT | 5.1 | 5.8 | 5 | 4.6 | 5.3 | 5.5 | — | 7.1 | — | 5.3 | 6.3 | 6 | 5.8 | 7.8 | 4.9 | 5.2 |
| 24 hours @ 158° F./158° F. | 1.7 | 1.9 | 2.4 | 1.8 | 1.7 | 1.7 | — | 2 | 2.1 | 1.7 | 1.8 | 1.6 | 1.2 | 2.3 | 1.9 | 1.5 |
| 7 days @ 158° F./158° F. | 2.6 | 2.9 | 2.6 | 2.3 | 2.3 | 2.5 | — | 2.9 | — | 2.7 | 2.2 | 2.2 | 2.2 | 2.6 | 2.8 | 2.7 |
| 7 days @ 158° F./RT | 8 | 7.9 | 8.6 | 7.9 | 9.5 | 8.5 | — | 9.7 | — | 7.4 | 8.7 | 9.3 | 8.3 | 9.6 | 8.7 | 8.7 |
| Shear Adhesion Testing | | | | | | | | | | | | | | | | |
| 24 hours @ RT/RT | 18.6 | 19.7 | 19.7 | 17.2 | 19.7 | 18.7 | — | — | — | 19.1 | 23.1 | 21.2 | 14.4 | 21.4 | 16 | 16.5 |
| 24 hours @ 158° F./158° F. | 12.5 | 13.3 | 13.2 | 12.3 | 11.7 | 13 | — | — | — | 12.8 | 11.9 | 10.5 | 6.6 | 11.4 | 11 | 10 |
| 24 hours @ 158° F./RT | 24.2 | 27.9 | 28.3 | 24 | 27.5 | 26.7 | — | — | — | 26.3 | 24.4 | 26.1 | 17.8 | 27.7 | 24 | 24.4 |
| Physical Properties | | | | | | | | | | | | | | | | |
| Tack Back (mm) | 3 | 7 | 2 | 4 | 3 | 4 | 5 | 3 | 3 | 4 | 3 | 3 | 20 | 3 | 50 | 50 |
| Viscosity (cps) | 12000 | 8400 | 5000 | 300 | 1200 | 1200 | — | — | 1200 | 900 | 350 | 150 | 160 | 900 | 1710 | 1740 |
| Solids (% by weight) | 15.20 | 14.00 | 14.10 | 9.30 | 11.4 | 11.5 | — | 11.5 | — | 11.9 | 16.2 | 14 | 16.5 | 11.4 | 15 | 15 |

Based on the foregoing data, the superiority of the primer compositions of the present invention should be evident. In many roofing applications, the performance of the primer solution within the first 24 hours of application (i.e., the early green strength) is often crucial. Accordingly, the fact that the compositions of the present invention pass the dead weight shear test, while other primer compositions failed the test indicates superiority in the intended use. Furthermore, inasmuch as extreme heat is typically experienced on a rooftop, the fact that the compositions of the present invention performed very well as compared to the prior art at temperatures such as 158° F. is also indicative of superiority for use in the intended application.

Thus, it should be evident that the compositions of the present invention are particularly useful as elastomeric based primer compositions and indeed represent a number of improvements over the prior art. The invention is particularly suited for use as a primer composition that is typically used in conjunction with an adhesive tape, but is not necessarily limited thereto inasmuch as the compositions' use as solvent based adhesives is also contemplated. It should also be understood that although the primer compositions of the present invention are particularly useful in conjunction with EPDM membranes, the primer can also be used in conjunction with asphalt based roofing compositions. For example, the primer can be used to prime masonry, concrete or metal prior to the application of an asphalt roofing material.

Based upon the foregoing disclosure, it should now be apparent that the use of the primer composition described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A roofing primer composition comprising:
   a bromobutyl rubber;
   from about 18 to about 38 parts by weight per one hundred parts by weight rubber of a polyurethane, wherein said polyurethane is the reaction product of a phenolic resin and an isocyanate having more than two functionalities, said polyurethane being formed in the presence of an alkali phenoxide catalyst; and
   a solvent, wherein said solvent is selected from the group consisting of parachlorobenzotrifluoride, 1-dodecene, toluene, hexane, heptane, methylene chloride, 1,1,1-trichlorethane, xylene, methanol, 1-tetradecene, chloroform, tetrachloro ethylene and ethanol.

2. A roofing primer composition, as set forth in claim 1, wherein said isocyanate is selected from the group consisting of methylene diphenyl diisocyanate, isophorone diisocyanate, and polymeric 1,6-hexane diisocyanate.

3. A roofing primer composition, as set forth in claim 1, wherein said alkaliphenoxide catalyst is potassium p-nonylphenoxide.

4. A roofing primer composition, as set forth in claim 1, wherein the composition comprises from about 700 to about 1,600 parts by weight per hundred parts by weight rubber of said solvent.

5. A roofing primer composition, as set forth in claim 1, wherein the composition comprises from about 400 to about 1,000 parts by weight per hundred parts by weight of said solvent.

6. A roofing primer composition, as set forth in claim 1, wherein said solvent comprises parachlorobenzotrifluoride.

7. A roofing primer composition, as set forth in claim 1, wherein the composition contains less than about one hundred parts per million of reactive isocyanate groups.

8. A roofing primer composition, as set forth in claim 1, wherein the composition further comprises a scavenger selected from the group consisting of methyl alcohol, water, primary alcohols, and secondary amines.

9. A roofing primer composition, as set forth in claim 1, wherein the catalyst is employed in an amount from about 2 to about 5 parts by weight per one hundred parts rubber.

10. A roofing primer composition comprising:
    an elastomer;
    a polyurethane component, wherein said polyurethane comprises the reaction product of a multi-functional polyol and a multi-functional isocyanate; and
    a solvent.

11. A roofing primer, as set forth in claim 10, wherein said polyurethane comprises a highly branched polyurethane.

12. A roofing primer, as set forth in claim 11, wherein said multi-functional isocyanate is a tri-functional isocyanate.

13. A roofing primer, as set forth in claim 12, wherein said isocyanate comprises more than two isocyanate functionalities.

14. A roofing primer, as set forth in claim 12, wherein said multi-functional polyol comprises a thermoplastic polyol.

15. A roofing primer, as set forth in claim 12, wherein said multi-functional polyol comprises a phenolic resin.

16. A roofing primer, as set forth in claim 10, wherein said polyurethane comprises a polyurethane that is the reaction product of an isocyanate having more than two isocyanate functionalities and a phenolic resin in the presence of a metallic complex catalyst.

17. A roofing primer, as set forth in claim 16, wherein said catalyst comprises a Group I metal phenoxide.

18. A roofing primer, as set forth in claim 16, wherein said catalyst is selected from the group consisting of Group I metal carboxylic acid salts, Group I metal phenoxides, and Lewis acids.

19. A roofing primer, as set forth in claim 16, wherein said catalyst comprises potassium p-nonylphenoxide.

20. A roofing primer, as set forth in claim 10, wherein said elastomer is selected form the group consisting of bromobutyl rubber, butyl rubber, polybutadiene, polyisoprene paramethyl styrene, chlorinated polyisoprene and poly vinyl chloride.

21. A roofing primer, as set forth in claim 20, wherein said elastomer is selected from the group consisting of bromobutyl rubber, halogenated polyisobutylene paramethyl styrene, chlorinated polyisoprene.

22. A roofing primer, as set forth in claim 20, said elastomer is bromobutyl rubber.

23. A roofing primer, as set forth in claim 10, wherein at least one molecule of said polyurethane component is interrelated with at least one molecule of said elastomer.

24. A roofing primer, as set forth in claim 10, wherein said solvent is selected from the group consisting of parachlorobenzotrifluoride, 1-dodecene, toluene, hexane, heptane methylene chloride, 1,1,1-trichlorethane, xylene, methanol 1-tetradecene, chloroform, tetrachloro ethylene and ethanol.

25. A roofing primer, as set forth in claim 24, wherein said solvent comprises parachlorobenzotrifluoride.

26. A roofing primer, as set forth in claim 24, wherein said solvent is dodecene.

27. A roofing primer, as set forth in claim 10, wherein the composition contains less than about one hundred parts per million of reactive isocyanate groups.

28. A roofing primer, as set forth in claim 10, wherein the composition comprises from about 18 to about 38 parts by weight per one hundred parts by weight rubber of said polyurethane, and from about 700 to about 1,600 parts by weight per one hundred parts by weight rubber of said solvent.

29. A roofing primer composition, as set forth in claim 10, wherein the composition further comprises a scavenger selected from the group consisting of methyl alcohol, water primary alcohols, and secondary amines.

30. A primer composition prepared by the step of:
admixing a composition comprising
a polyisocyanate component;
a polyol component;
a catalyst for enhancing the formation of polyurethane;
an elastomer; and
a solvent.

31. A primer composition, set forth in claim 30, wherein the polyol component is a phenolic resin.

32. A primer composition, set forth in claim 30, further comprising the step of adding a scavenger selected from the group consisting of methyl alcohol, water, primary alcohols, and secondary amines.

33. A primer composition, as set forth in claim 30, wherein the polyol component and the elastomer are masterbatched prior to said step of admixing.

34. A method of preparing a roofing primer composition comprising the step of:
admixing a polyisocyanate component;
a phenolic resin component;
a catalyst for enhancing the formation of polyurethane;
an elastomer; and
a solvent.

35. A method of preparing a roofing primer, as set forth in claim 34, wherein the phenolic resin component and the elastomer are masterbatched prior to said step of admixing.

36. A roofing primer composition, as set forth in claim 1, wherein said polyurethane is formed in the presence of said bromobutyl rubber.

37. A roofing primer composition, as set forth in claim 10, wherein said polyurethane is formed in the presence of said elastomer rubber.

38. A roofing composition, as set forth in claim 30, wherein said step of admixing includes combining the polyisocyanate component and the polyol component in the presence of the elastomer.

39. A method of preparing a roofing primer, as set forth in claim 34, wherein said step of admixing includes combining the polyisocyanate component and the phenolic resin component in the presence of the elastomer.

* * * * *

UNITED STATES PATENT AND TRADEMARK OFFICE
Certificate

Patent No. 5,985,981                                                                      Patented: November 16, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Brian S. Alexander, Sheridan, Indiana; John W. Fieldhouse, Carmel, Indiana; and William B. Gorman, Mooresville, Indiana Signed and Sealed this Eighth Day of January 2002.

VASUDEVAN S. JAGANNATHAN
                                                                              *Supervisory Patent Examiner*
                                                                                          Art Unit 1714